US011710474B2

(12) United States Patent
Kumar et al.

(10) Patent No.: US 11,710,474 B2
(45) Date of Patent: Jul. 25, 2023

(54) TEXT-TO-SPEECH FROM MEDIA CONTENT ITEM SNIPPETS

(71) Applicant: Spotify AB, Stockholm (SE)

(72) Inventors: Rohit Kumar, Austin, TX (US); Henrik Lindström, Stockholm (SE); Henriette Cramer, San Francisco, CA (US); Sarah Mennicken, San Francisco, CA (US); Sravana Reddy, Cambridge, MA (US); Jennifer Thom-Santelli, Boston, MA (US)

(73) Assignee: Spotify AB, Stockholm (SE)

( * ) Notice: Subject to any disclaimer, the term of this patent is extended or adjusted under 35 U.S.C. 154(b) by 272 days.

(21) Appl. No.: 17/146,804

(22) Filed: Jan. 12, 2021

(65) Prior Publication Data

US 2021/0241753 A1    Aug. 5, 2021

Related U.S. Application Data

(63) Continuation of application No. 16/235,776, filed on Dec. 28, 2018, now Pat. No. 11,114,085.

(51) Int. Cl.
*G10L 13/00* (2006.01)
*G06F 16/683* (2019.01)
*G10L 13/04* (2013.01)

(52) U.S. Cl.
CPC ............ *G10L 13/00* (2013.01); *G06F 16/685* (2019.01); *G10L 13/04* (2013.01)

(58) Field of Classification Search
CPC .......... G10L 13/00; G10L 13/02; G10L 13/04
See application file for complete search history.

(56) References Cited

U.S. PATENT DOCUMENTS

| | | | |
|---|---|---|---|
| 5,860,064 A | 1/1999 | Henton | |
| 7,096,183 B2 | 8/2006 | Junqua | |
| 7,124,082 B2 | 10/2006 | Freedman | |
| 7,567,896 B2 | 7/2009 | Coorman et al. | |
| 8,073,854 B2 | 12/2011 | Whitman et al. | |
| 8,433,431 B1 | 4/2013 | Master et al. | |
| 8,666,749 B1 | 3/2014 | Subramanya et al. | |
| 10,140,973 B1* | 11/2018 | Dalmia | G10L 15/26 |
| 11,114,085 B2 | 9/2021 | Kumar et al. | |

(Continued)

FOREIGN PATENT DOCUMENTS

| | | |
|---|---|---|
| EP | 1835488 A1 | 9/2007 |
| JP | 2013-8357 A | 1/2013 |

OTHER PUBLICATIONS

Paul Kehrer "Frinkiac—The Simpsons Screenshot Search Engine", Langui.sh (Feb. 2, 2016). Available at: https://angui.sh/2016/02/02/frinkiac-the-simpsons-screenshot-search-engine/.
Mustapha et al., "Text-to-Speech Synthesis Using Concatenative Approach", IJTRD, vol. 3(5), pp. 459-462 (Sep.-Oct. 2016).
Dzhambazov et al. "Automatic Lyrics-To-Audio Alignment in Classical Turkish Music", Univ. Pompeu Fabra, p. 61-64 (2014).

(Continued)

*Primary Examiner* — Jialong He
(74) *Attorney, Agent, or Firm* — Merchant & Gould, P.C.

(57) ABSTRACT

A text-to-speech engine creates audio output that includes synthesized speech and one or more media content item snippets. The input text is obtained and partitioned into text sets. A track having lyrics that match a part of one of the text sets is identified. The location of the track's audio that contains the lyric is extracted based on forced alignment data. The extracted audio is combined with synthesized speech corresponding to the remainder of the input text to form audio output.

20 Claims, 6 Drawing Sheets

(56) References Cited

U.S. PATENT DOCUMENTS

| | | |
|---|---|---|
| 2003/0074196 A1 | 4/2003 | Kamanaka |
| 2003/0200858 A1 | 10/2003 | Xie |
| 2005/0131559 A1 | 6/2005 | Kahn et al. |
| 2006/0028951 A1* | 2/2006 | Tozun ............... G11B 3/64 369/84 |
| 2007/0055527 A1 | 3/2007 | Jeong et al. |
| 2008/0071529 A1 | 3/2008 | Silverman |
| 2008/0091571 A1 | 4/2008 | Sater |
| 2009/0076819 A1* | 3/2009 | Wouters ............ G10L 13/033 704/260 |
| 2009/0292535 A1 | 11/2009 | Seo |
| 2010/0145705 A1 | 6/2010 | Kirkeby |
| 2011/0066438 A1 | 3/2011 | Lindahl |
| 2011/0246186 A1 | 10/2011 | Takeda |
| 2011/0288862 A1* | 11/2011 | Todic ............... G10L 15/05 704/235 |
| 2014/0076125 A1* | 3/2014 | Kellett .............. G10H 1/36 84/609 |
| 2014/0200894 A1 | 7/2014 | Osowski et al. |
| 2018/0103000 A1 | 4/2018 | Guthery et al. |

OTHER PUBLICATIONS

Diemo Schwarz, "Current Research in Concatenative Sound Synthesis", ICMC, Ircam—Centre Pompidou, 4 pages (Sep. 5-9, 2005).
"TextGrid file formats" Phonetic Sci., Amsterdam (Aug. 21, 2018). Available at: http://www.fon.hum.uva.nl/praat/manual/TextGrid_file_formats.html.
Van den Oord et al., "Wavenet: A Generative Model for Raw Audio", CoRR abs/1609.03499 (2016).
Shen and Lee, "Digital Storytelling Book Generator with MIDI-to-Singing", Applied Mechanics and Materials, vol. 145, Trans Tech Publications, Ltd., pp. 441-445 (Dec. 2011).
Extended European Search Report from European Appl'n No. 19214458.2, dated May 28, 2020.
European Search Report for EP Appln. No. 21167170.6 dated Jul. 30, 2021 (9 pages).
Fujihara et al. "LyricSyncrhonizer: Automatic Synchronization System Between Musical Audio Signals and Lyrics." IEEE J. of Selected Topics in Signal Processing, vol. 5, No. 6, Oct. 2011, pp. 1251-1261.

* cited by examiner

TEXT-TO-SPEECH FROM MEDIA CONTENT ITEM SNIPPETS

CROSS REFERENCE TO RELATED APPLICATIONS

This application is a Continuation of U.S. patent application Ser. No. 16/235,776, filed 28 Dec. 2018, which is hereby incorporated by reference in its entirety. To the extent appropriate, a claim of priority is made to the above disclosed application.

TECHNICAL FIELD

The present disclosure relates to technical solutions for text-to-speech systems.

BACKGROUND

Text-to-speech systems (often abbreviated as TTS systems) convert text input into an audio output, typically the audio output is designed to mimic a human speaking text. Text-to-speech systems play a significant function in utterance-based human-machine interfaces. Many devices use text-to-speech systems to give voice to virtual assistants (e.g., the SIRI virtual assistant by APPLE, the CORTANA virtual assistant by MICROSOFT, GOOGLE ASSISTANT by GOOGLE, and the AMAZON ALEXA virtual assistant by AMAZON), such as those operating on phones and smart speaker systems.

One technique that text-to-speech systems use to produce speech output includes determining a phoneme sequence from text. The phoneme sequence is then converted into synthesizer data, which is used by a speech synthesizer to produce output waveforms representative of the text. Improvements to text-to-speech systems can have corresponding improvements in the ability of a human-machine interface (HMI) to interact with users, such as by improving the expressiveness of the HMI.

US 2007/0055527 describes a voice synthesis system that converts a text coming from a client apparatus into voices by analyzing the text. The system has a background sound mixer that mixes background sound with synthesized voices and a modulator for imparting sound-modulation effect to the synthesized voices.

SUMMARY

The present disclosure provides methods, apparatuses, and computer-readable products for generating audio output from text input.

In an example, there is a system providing text-to-speech functionality. The system includes a forced alignment data store having stored thereon forced alignment data for tracks and a combining engine. The combining engine obtains input text; portions the input text into a first text set and a second text set; identifies a first track having first track lyrics that include the first text set; identifies, using the forced alignment data, a first audio location of the first track corresponding to the first text set; creates a first audio snippet containing the first audio location; using a speech synthesizer, creates a synthesized utterance based on the second text set; combine the first audio snippet and the synthesized utterance to form combined audio; and provides an audio output that includes the combined audio.

In some examples, the forced alignment data describes alignment between audio data of the tracks and lyrics data of the tracks. In some examples, the forced alignment data describes, for each of the tracks, lyrics data and time data of where lyrics occur in the audio data. In some examples, the input text has a third text, and the combining engine is further configured to identify a second track based on the second track having second track lyrics containing the third text set; and create a second audio snippet from the second track based on the third text set. In some examples the combined audio further includes the second audio snippet. In some examples, identifying the second track is further based on audio characteristics of the first track and the second track.

In some examples, identifying the second track includes selecting the second track based on similarities in musical style between the first track and the second track. In some examples, the similarities in musical style between the first track and the second track is determined based on a distance between the two tracks in vector space. In some examples, the system further includes a forced alignment engine for aligning input track audio and input track lyrics. In some examples, the forced alignment engine is configured to find a Viterbi path through the input track lyrics and the input track audio under an acoustic model. In some examples, the forced alignment engine is configured to align the input track lyrics and input track audio on a line-by-line basis. In some examples, the forced alignment engine is configured to: receive a third track having track metadata; receive third track lyrics associated with the third track; select an acoustic model from an acoustic model data store based on the track metadata; using the acoustic model, generate third-track forced alignment data that aligns audio data of the third track and the third track lyrics; and add the third-track forced alignment data to the forced alignment data store. In some examples, the combining engine is further configured to determine a quality described in the input text, and identifying the first track is based at least in part on the quality. In some examples, the quality is a music genre or music artist.

In an examples, a method performs: obtaining input text; portioning the input text into a first text set and a second text set; determine a quality described in the first text set; identifying a first track based on: the first track having first track lyrics that include the first text set; and the first track having the quality; identifying, using forced alignment data, a first audio location of the first track corresponding to the first text set; creating a first audio snippet containing the first audio location; using a speech synthesizer, creating a synthesized utterance based on the second text set; combining the first audio snippet and the synthesized utterance to form combined audio; and providing an audio output that includes the combined audio.

In an example, the input text further has a third text set; and the method further includes identifying a second track based on the second track having second track lyrics containing the third text set based on similarities in musical style between the first track and the second track; and creating a second audio snippet from the second track based on the second text set. The combined audio further includes the second audio snippet.

BRIEF DESCRIPTION OF THE DRAWINGS

The features and advantages of the present disclosure are apparent from the detailed description set forth below when taken in conjunction with the following drawings.

DETAILED DESCRIPTION

Figure 1:
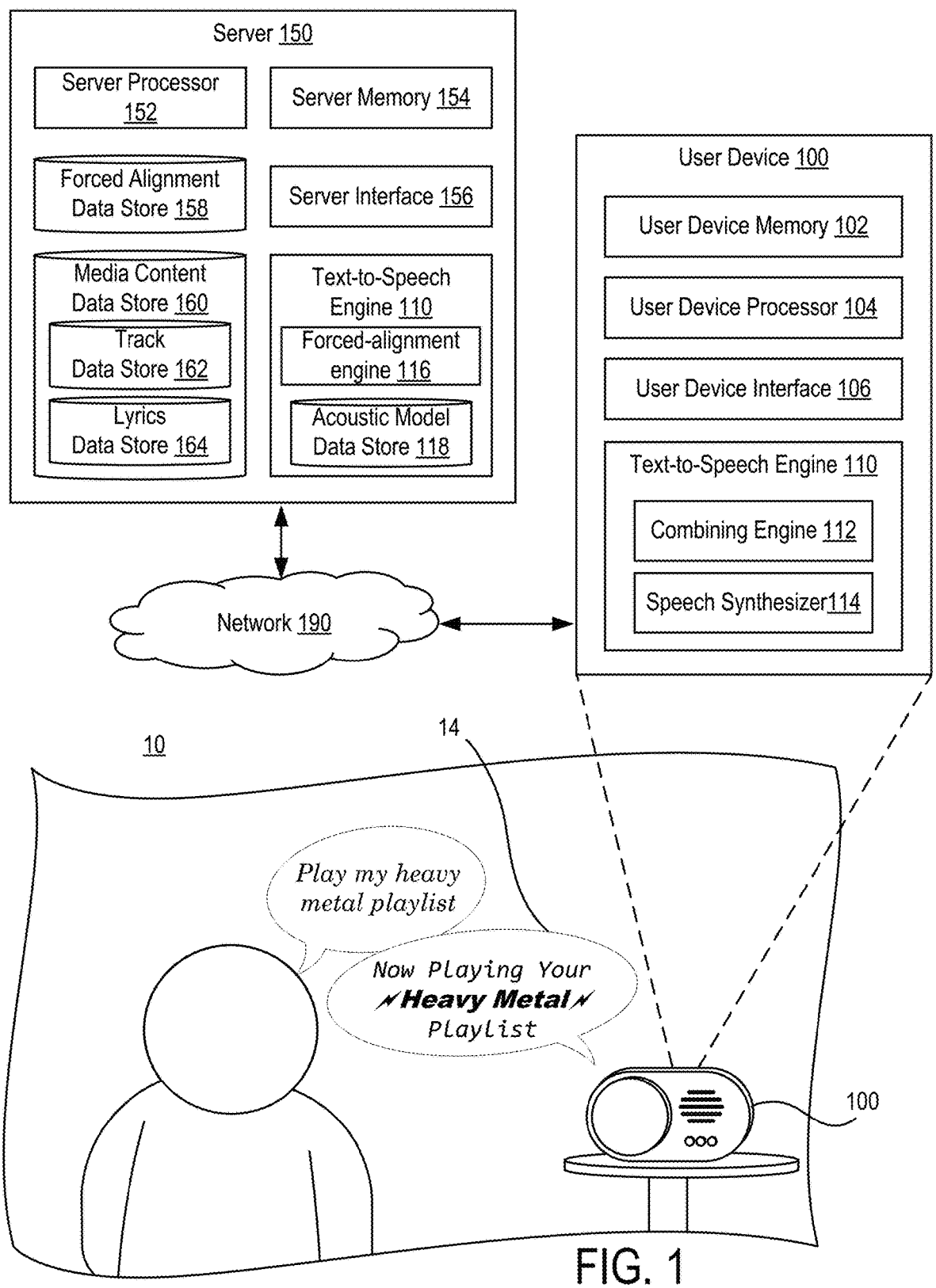
FIG. 1 illustrates an example system that provides audio output using text-to-speech functionality according to an example embodiment of the present invention.

The example embodiments presented herein are directed to systems, methods, and non-transitory computer-readable medium products for generating audio output from text input. In many examples, the audio output is formed from a combination of one or more audio snippets, such as audio snippets taken from tracks or other media content items. Where the audio snippets are taken from copyrighted media content items, the audio snippets can used in accordance with relevant permission or license from the rights holder. In examples, the selection of tracks is performed as a selection of a plurality of tracks that have been licensed or are already available for this purpose. For ease of understanding, many example aspects of the embodiments described herein are described in relation to tracks. This description is not intended to limit the application of the example embodiments presented herein. In fact, after reading the following description, it will be apparent to one skilled in the relevant art(s) how to implement the following example embodiments in alternative embodiments (e.g., involving other types of media content items).

A track is an audio recording. Typically the audio recording is a recording of a piece music (e.g., a song). Tracks are often associated with lyrics and metadata. Lyrics refer to vocalized content of the tracks. Most commonly, the vocalized content corresponds to the words of the track, which are typically sung, spoken, or rapped. Metadata is data about data. With respect to media content, metadata is data that describes information about the media content item and/or the media content itself. For example, with regard to a track metadata, the metadata can contain information such as track length, track identifier (e.g., a unique identifier of the track), and track location (e.g., where it is stored). Media content can be described according to multiple facets. Such facets can be stored in a data store.

Facets (also sometimes referred to as descriptive facets) describe attributes of the media content. The list of facets is innumerable and includes, for example: genre, locale, mood, opinion, instrumentation, style, time period, era/epoch, recording label, organizational, social signaling, musical setup, main instruments, variant, dynamics, tempo, metric, situation, character, language, rhythm and popularity. Multifaceted descriptions have been used for media content browsing and recommendation. In example, a facet expressed as a key-value pair between a facet type and one or more facet values, such as: {tempo: 60 bpm} or {genre: rock, blues}. A media content item is an item of media content, including audio, video, or other types of media content, which may be stored in any format suitable for storing media content. Non-limiting examples of media content items include tracks, music, albums, audiobooks, music videos, movies, television episodes, podcasts, other types of audio or video content, and portions or combinations thereof. Media content items often have vocalized content. As described above, the vocalized content of tracks is expressed as lyrics. While examples herein are primarily explained in relation to lyrics, other content can be used. For instance, where a television show or podcast media content item is used, a transcript of the media content item is used instead of lyrics. Further, in some examples, non-lyrical music content of the track can be used, such as instrumental passages denoted by sheet music, tabs, or another representation.

Disclosed examples include a new form of text-to-speech system that incorporates snippets of media content items (e.g., music tracks) into speech output, thereby improving the expressiveness of an HMI that uses the new text-to-speech system. In an example, the text-to-speech system combines snippets of music tracks to form the "voice" of a virtual assistant. For instance, rather than verbalizing the text "now playing your rock and roll playlist" using a traditional text-to-speech system, the text-to-speech engine combines snippets of tracks where the constituent words and phrases are sung, spoken, or rapped.

Example aspects of the present invention provide new technical solutions for managing and combining one or more snippets from one or more tracks to form an audio output based on text input. Traditional text-to-speech systems lack such a feature. In an example embodiment, a text-to-speech system includes a forced alignment data store and a combining engine. The forced alignment data store has forced alignment data describing alignment between audio of tracks and lyrics of tracks. For instance, for each respective track, the forced alignment data includes timestamps of where each lyric of the respective track is located within the respective track (e.g., where it can be heard in the audio of the respective track). A timestamp is data describing time, such as a point in time relative to the start of a track (e.g., a number of seconds). The forced alignment data can include multiple timestamps, such as a start time and an end time in the track for each lyric of the track.

The combining engine creates audio output of the text-to-speech system by combining audio snippets from two or more sources (e.g., sampled portions from two or more media content items). In an example, the combining engine obtains input text having first text set and a second text set. The combining engine identifies a first track having lyrics containing the first text set. The combining engine then uses the forced alignment data to identify a first audio location of the first track that corresponds to the first text set. An audio snippet is generated from the first track that includes the first audio location. In an example, the text-to-speech system uses a speech synthesizer to vocalize the second text set. In another example, combining engine identifies a second track based on the second track having the second text set in its lyrics and also based on similarities in the audio characteristics of both tracks (e.g., characteristics that contribute to a good transition between the tracks, such as key, beats, and tone, among other characteristics). For instance, the identification is based on similarities in musical style between the first and second tracks. For instance, the similarities of the tracks is determined based on a distance between the two tracks in vector space. A second audio snippet is created from the second track based on the second text set. The combining engine combines the first audio snippet and the second audio snippet to form combined audio. In turn, the combined audio is provided as output.

In an example, the text-to-speech system further determines a quality described in the input text. The quality is an attribute of the text. The quality can be used for identifying tracks based on their similarity to the text. In examples, the qualities used to describe text can be similar to facets used to describe media content items. Then, the tracks are selected based at least in part on the quality. For instance, the word "blues" in the input text "now playing your blues playlist" can be identified as a quality of the input text. Based on that quality, blues tracks can be selected.

In further examples, such as where the text input is from a virtual assistant, the text input is associated with a personality value (e.g., inferred from the text input or expressly provided in conjunction with the text input). In some embodiments, the personality value describes a desired personality with which to express the input text. Personality values can reflect, for example, a happy, sad, aggressive, or laid-back personality among others. The personality value can be used to select a speech synthesizer or parameters thereof, as well as to select tracks.

Traditional text-to-speech systems are designed to generate natural sounding human speech. By contrast, certain examples herein can be designed to produce interesting or exciting output, even if the output is unnatural. For instance, a listener would readily determine that the output of some embodiments herein was not the product of typical human speech because the output is the combination of audio from multiple sources (e.g., including a music track) but may nonetheless find the output exciting and interesting. In this manner, disclosed examples can produce improved output (e.g., output that is more interesting or exciting) compared to traditional techniques.

In further examples, the audio snippet from the track need not actually be of a portion in the song where the lyrics are sung. For instance, the audio snippet could instead be audio content that is evocative of the concept expressed by the lyric. For instance, for the input text "playing your rock playlist", the word "rock" could be replaced by an instrumental audio snippet of a guitar riff or lick that is evocative of rock music.

In an example, the text-to-speech system further includes a forced alignment engine for aligning audio and lyrics of tracks. The forced alignment engine receives a track's audio and the track's lyrics. Then an acoustic model is selected based on the style of music of the track. The acoustic model is used to generate forced alignment data that aligns the audio and lyrics of the track. The forced alignment data is added to the forced alignment data store. Particular techniques can be applied to tailor the forced alignment process to audio tracks (e.g., as opposed to regular speech). In an example, acoustic cues in the track are used enhance alignment of lyrics to the audio, even in instances without manual line boundaries. In another example, the acoustic model used to perform the forced alignment is trained for a particular type of music (e.g., specific artists or genres rather than entire datasets in order to improve accuracy).

System Providing Text-to-Speech Functionality

FIG. 1 illustrates an example system 10 that provides audio output 14 using a text-to-speech functionality. The system 10 has a user device 100 and a server 150 connected over a network 190.

The user device 100 is a computing device, such as a handheld entertainment device, smartphone, tablet, watch, wearable device, in-dash vehicle head unit, an aftermarket vehicle media playback appliance, a smart assistant device, a smart speaker, a smart home device, a television, a gaming console, a set-top box, a network appliance, a media player, a stereo system, an Internet-of-things device, or a radio, among other devices or systems. The user device 100 includes a user device memory 102, a user device processor 104, a user device interface 106, and a text-to-speech engine 110.

The user device memory 102 is one or a collection of components of the user device 100 that stores data. The data can include computer-readable instructions, data structures, program modules. The computer-readable instructions can include instructions to perform one or more of the operations described herein. Examples of user device memory 102 include transitory or non-transitory computer-readable media (e.g., memory accessible by the user device processor 104). Examples of user device memory 102 include memory based on magnetic-storage technology (e.g., hard disk drives), optical-storage technology (e.g., optical discs), read-only memory technology (e.g., EEPROM memory), and random-access-memory technology (e.g., flash memory), among other technology. In some examples, the user device memory 102 encompasses computer-readable communication media generally. Computer-readable communication media typically encodes data in a modulated signal (e.g., a carrier wave) or other transport mechanism and includes any information delivery media. The term "modulated data signal" refers to a signal that has one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media. The user device memory 102 can be a transitory or non-transitory computer-readable medium.

The user device processor 104 is one or more processing units, such as central processing units (CPU), digital signal processors, and field-programmable gate arrays, among others. The user device processor 104 is capable of executing instructions (e.g., instructions stored by the user device memory 102) to cause performance of operations (such as those described by processes herein).

The user device interface 106 is one or more components of the user device 100 by which the user device 100 can interact with the user or another device. In some examples, the user device interface 106 includes a human-machine interface by which the user device 100 receives input from or provides output to a user. For instance, the human-machine interface can include: a touch-based user interface (e.g., a touch screen for providing visual output to a user and receiving touch input from a user), an utterance-based user interface (e.g., a microphone for receiving voice input from a user and a speaker for providing synthesized voice output to the user), a hardware-button-based user interface (e.g., a hardware keyboard), a cursor-based user interface (e.g., a mouse or other pointing device), a tracking-based user interface (e.g., tracking device that tracks a hand, finger, eye, or wand), other user interfaces, or combinations thereof, and the user device 100 plays a media content item based thereon. The user device interface 106 can further include one or more components for communicating with another device, such as a wired (e.g., via Ethernet) or wireless (e.g., via a radiofrequency protocol, such as a cellular, BLUETOOTH, or WI-FI protocol) connection.

The user device interface 106 can further include a content output device operative to provide audio output. Examples of the content output device include a speaker assembly having one or more speakers, an audio output jack, a wireless transmitter (e.g., a BLUETOOTH transmitter), a display panel, and a video output jack. Other examples are possible as well, such as transmitting a signal through the audio output jack or wireless transmitter to reproduce an audio signal by a connected or paired device such as headphones, speaker system, or vehicle head unit.

The text-to-speech engine 110 converts text input into the audio output 14. The audio output 14 can mimic a human speaking the text input. As described in examples herein, the audio output 14 can also include words and phrases are sung or rapped from one or more tracks. In still other examples, the audio output can include musical passages representative of words or phrases. For instance, the text input may be "Now playing your classic rock playlist" and a portion of the audio output corresponding to the text "classic rock" is instead a guitar riff from a classic rock song. The text-to-speech engine 110 includes a combining engine 112 and a speech synthesizer 114.

The combining engine 112 is component of the text-to-speech engine 110 configured to provide audio output 14 that includes a combination of audio from multiple sources, such as a combination of synthesized speech audio and an audio snippet from a track. In many examples, the combining engine 112 controls selection of the audio from multiple sources for inclusion in the audio output 14. For instance, the combining engine 112 can select the audio based on audio qualities or similarities among audio sources as described elsewhere herein. In other examples, the combining engine 112 greedily joins the audio from multiple sources in a predefined manner (e.g., defined in a function call or based on audio metadata). The audio can be provided to the combining engine 112 from another component of the system 10, such as a component of the text-to-speech engine 110 configured to select audio for combining with the combining engine 112.

The speech synthesizer 114 is component that synthesizes speech. The synthesized speech is audio data designed to mimic audio of a human speaking text provided as input. The speech synthesizer 114 can be implemented using any of a variety of techniques, such as by concatenating segments of recorded speech or using formant synthesis. Implementations can include the use of deep learning or hidden Markov models. In the illustrated example, the speech synthesizer 114 is located at the user device 100. In some examples, the server 150 implements the speech synthesizer 114, and the user device 100 cooperates with the server 150 to provide text input to and receive audio output from the speech synthesizer 114.

The server 150 is a computing device that provides services for other computing devices. In the illustrated example, the server 150 includes components that provide services to the user device 100 for operating the text-to-speech engine 110. In some examples, the server 150 is operated or provided by a virtual assistant service. The server 150 can provide other services. In some examples, the server 150 is operated or provided by a subscription-based media streaming service to which a user may have an account.

The server 150 includes a server processor 152, a server memory 154, a server interface 156, a forced alignment data store 158, and a media content data store 160. In some examples, the text-to-speech engine 110 includes a forced alignment engine 116 and an acoustic model data store 118. The server processor 152, the server memory 154, the server interface 156 are respectively processor, memory, and interface components of the server and can each share attributes with their counterpart components of the user device 100. Although the figure illustrates the various components as being within a single server 150, they need not be. The various components can be spread across multiple virtual or physical devices to provide the described capabilities.

The forced alignment engine 116 is an engine that produces forced alignment data. In an example, the forced alignment engine 116 produces forced alignment data using the process shown in FIG. 3 (which is described in more detail below). The forced alignment engine 116 can produce the forced alignment data using an acoustic model, such as one stored in the acoustic model data store 118. An acoustic model is model describing the relationship between the pronunciation of the lyrics (e.g., the phonemes thereof) and the audio itself. The acoustic model data store 118 is a data store that stores acoustic models. In examples, the acoustic model data store 118 stores a plurality of acoustic models. The plurality of acoustic models can include acoustic models that are generated for use with specific kinds of media content items (e.g., tracks or podcasts), for use with specific genres of media content items (e.g., rock, blues, or rap), for use with specific artists, or for use with specific kinds of vocalized lyrics (e.g., spoken, sung, or rapped), among others.

Figure 4:
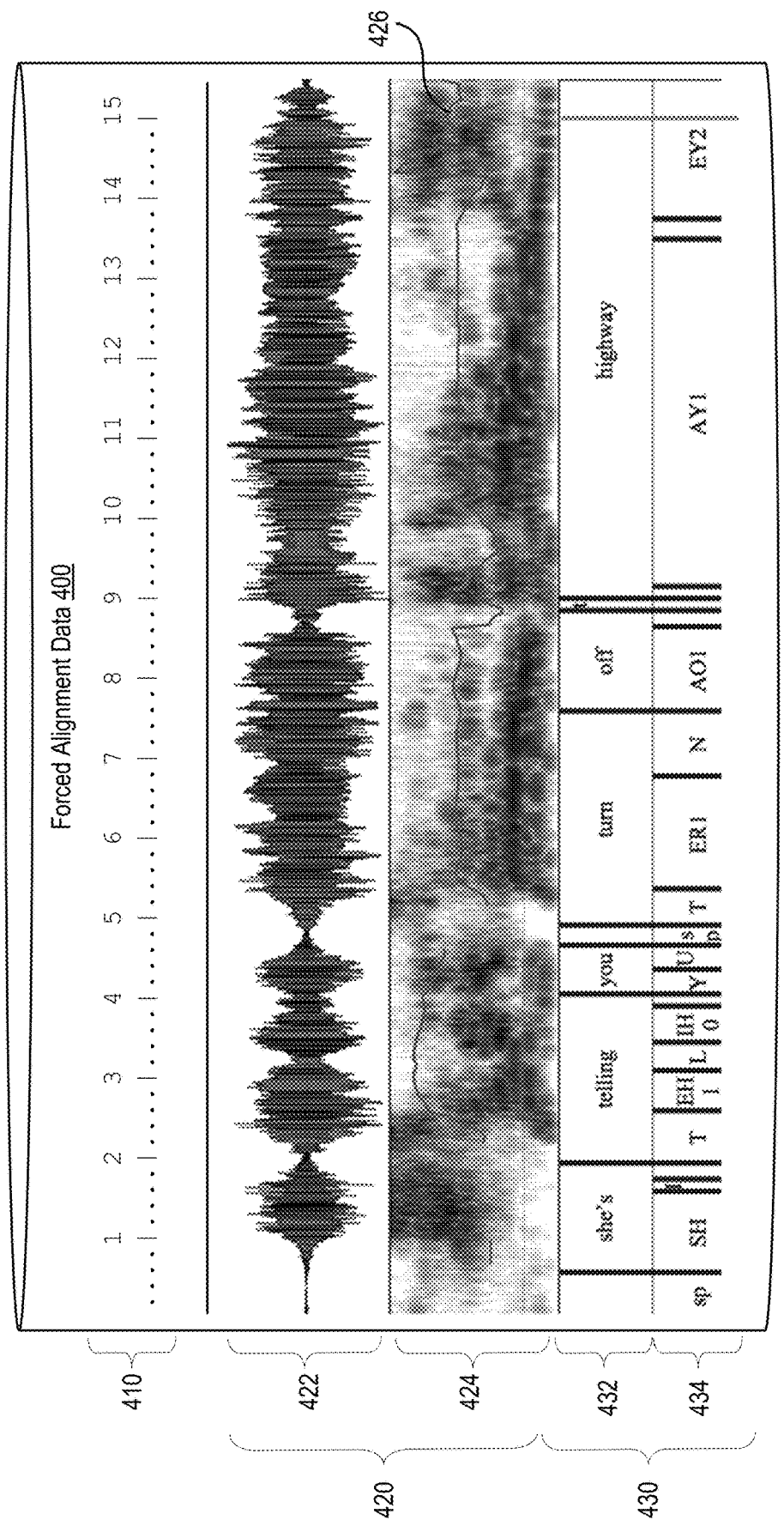
FIG. 4 illustrates an example visual representation of forced alignment data according to an example embodiment of the present invention.

The forced alignment data store 158 is a data store that stores forced alignment data. Forced alignment data is data regarding alignment of lyrics with the corresponding audio of the track where portions (e.g., lines, phrases, words, syllables, or phonemes of the lyrics) of the lyrics occur. The forced alignment data typically expresses the alignment in terms of a time in the audio in which particular lyrics (or portions thereof) occur. An example of forced alignment data is shown in FIG. 4 (which described in more detail below). The forced alignment data can be stored in any of a variety of formats, such as in TEXTGRID format (e.g., using the TEXTGRID research environment supported by DARIAH-DE).

The media content data store 160 is a data store that stores data regarding media content items, such as tracks. In some examples, the media content data store 160 stores data for each of a plurality of media content items in a data structure (e.g., record of a table or other data structure) associated with each media content item. An example media content item data structure of the media content data store 160 stores data regarding a particular media content item in one or more fields, such as an ID field (e.g., storing an identifier of the media content item data structure), a title field (e.g., storing a title of the media content item data structure, such as a song title), a content field (e.g., storing the content of the media content item or a link to the content of the media content item data structure, such as the audio content of a song), and an audio fingerprint field. In some examples, the media content item data structure further stores metadata for the track. The media content item data structure can further store facets of the media content item. The media content data store 160 includes or is associated with a track data store 162 and a lyrics data store 164. The track data store 162 is a data store that stores audio of tracks in a format suitable for storing media content. The lyrics data store 164 is a data store that stores lyrics of media content items. In an example, the lyrics data store 164 is a database that stores records having lyric data.

The network 190 is an electronic communication network that supports communication between the user device 100 and the server 150. An electronic communication network includes a set of computing devices and links between the computing devices. The computing devices in the network 190 use the links to enable communication among the computing devices in the network. The network 190 can include components, such as routers and other types of computing devices. In various examples, the network 190 includes various types of links. For example, the network 190 includes wired and wireless links. Furthermore, in various examples, the network 190 is implemented at various scales (e.g., as a local area network or a wide area network, such as the internet).

In some examples the server 150 is or is part of a media-delivery system that streams, progressively downloads, or otherwise communicates music, other audio, video, or other forms of media content items to the user device 100 for later playback. The user device interface 106 can be configured to receive a user request to, for example, select media content for playback on the user device 100.

Text-to-Speech Process

Figure 2A:
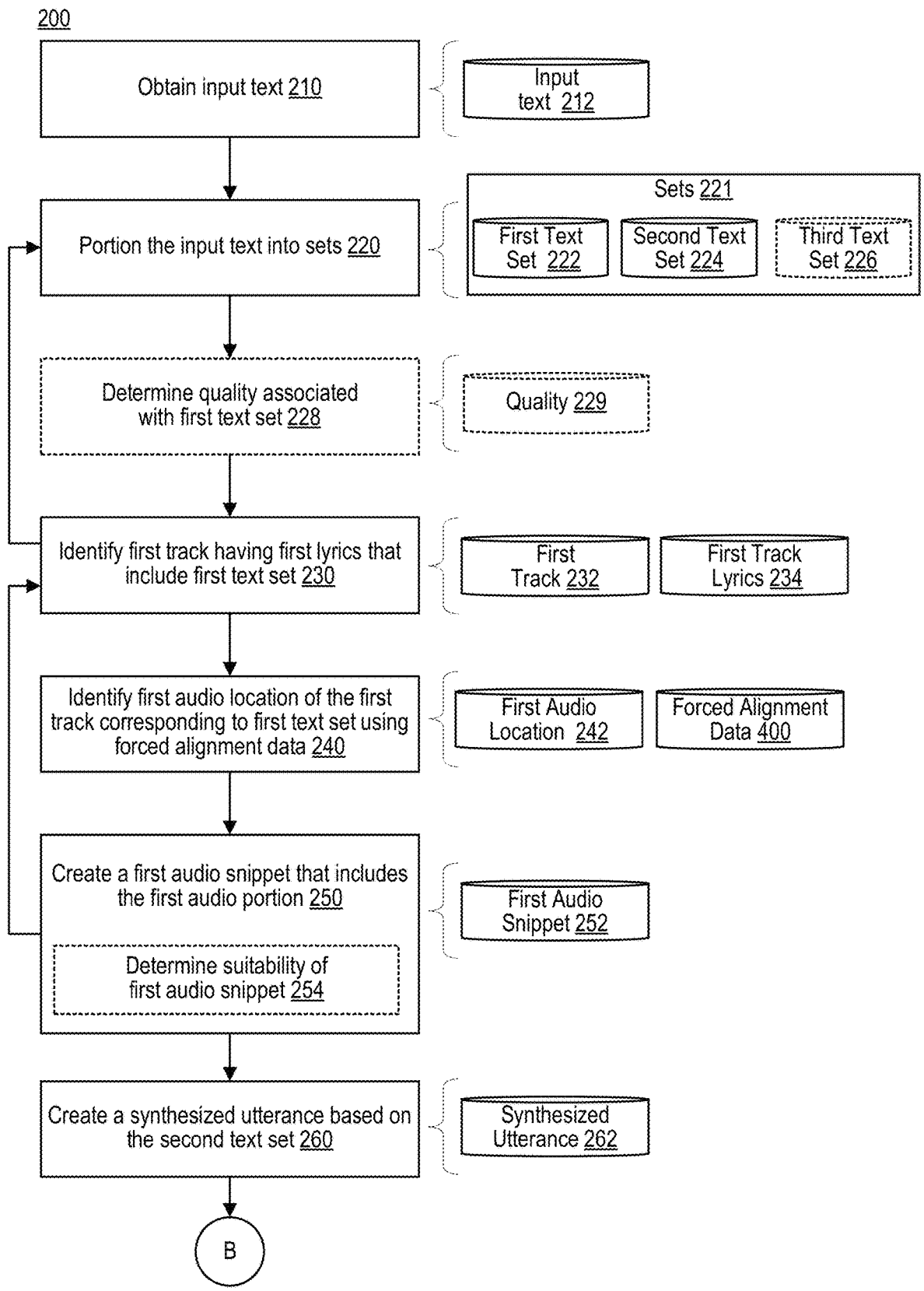
FIG. 2, which is made up of FIG. 2A and FIG. 2B, illustrates a process for generating an audio output from input text according to an example embodiment of the present invention.
Figure 2B:
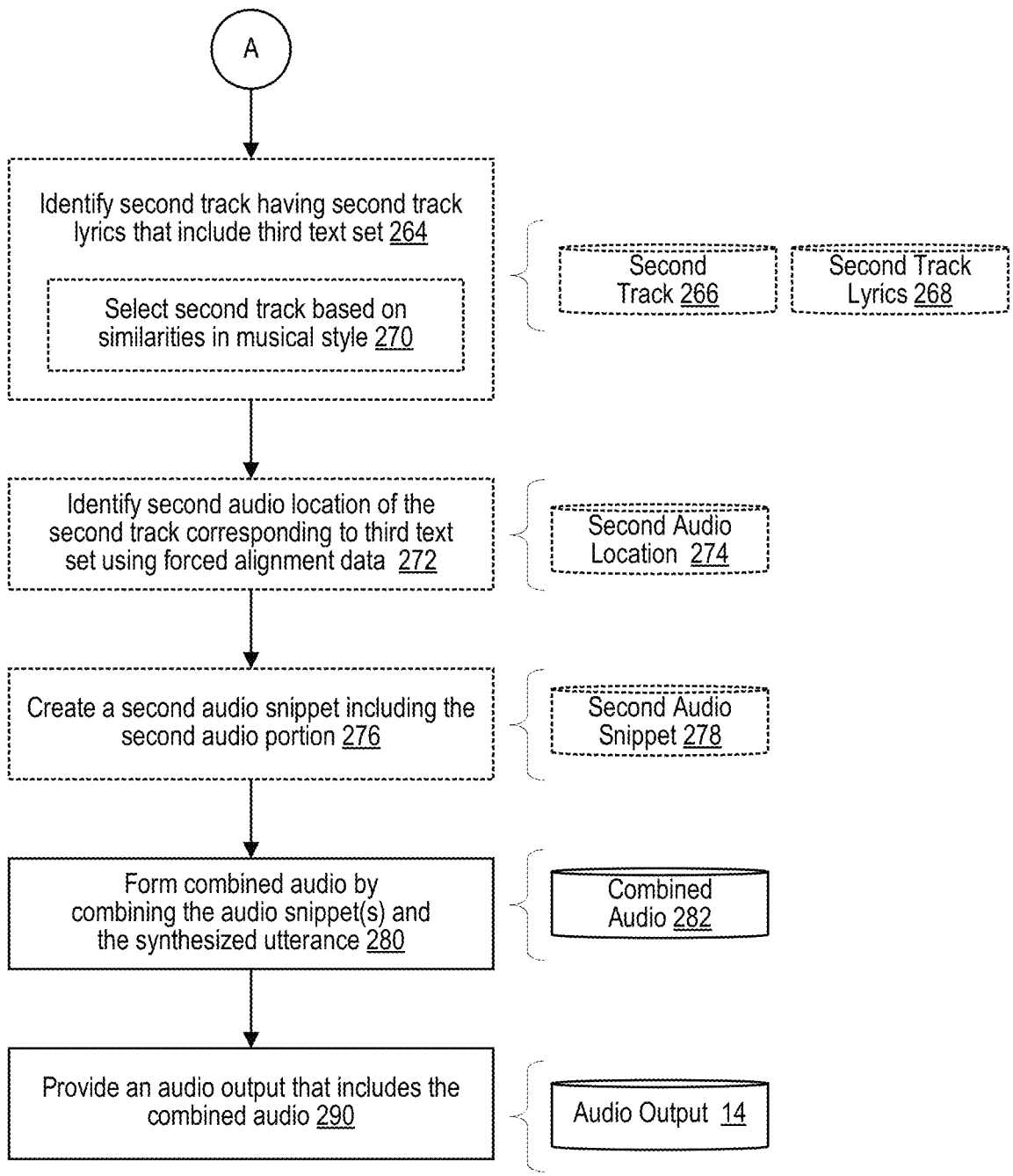

FIG. 2, which is made up of FIG. 2A and FIG. 2B, illustrates a process 200 for generating audio output 14 based on input text 212. In an example, one or more operations are provided by the text-to-speech engine 110, such as on the user device 100, server 150, or a combination thereof. In the illustrated example, the process 200 begins with operation 210.

Operation 210 includes obtaining the input text 212. The input text 212 is text data that is to be used to generate the audio output 14. The input text 212 can be obtained in any of a variety of ways, such as from a program (e.g., a program operating on the user device 100 that provides virtual assistant functionality or accessibility services). In an example, the text-to-speech engine 110 provides an Application Programming Interface (API) or otherwise exposing a function over which input text 212 can be received from another program. In still other examples, obtaining the input text 212 includes providing a user interface via the user device interface 106 over which the input text 212 can be received from a user. In further examples, the input text 212 is obtained from a data store. Once obtained, the input text 212 can be stored in a data store, such as a database. Following operation 210, the flow moves to operation 220.

Operation 220 includes portioning the input text 212 into one or more sets 221. As illustrated, the sets 221 include a first text set 222, a second text set 224, and in some examples a third text set 226 The sets 221 can be stored in any appropriate data structure. In an example, the sets 221 are stored as arrays or lists of strings. In many examples, the sets 221 represent delineations of how text is to be processed in later operations. For instance, as described in relation to the process 200, the contents of the first text set 222 are converted into audio output using a first track and the contents of the second text set 224 are converted into audio output using a speech synthesizer, and the contents of the third text set 226 are converted into audio output using a second track. The sets 221 may, but need not, include contiguous portions of the input text 212 (e.g., portions adjacent in the input text 212). Further, the contents of the sets 221 can be delineated in various ways, such as by phoneme, word, phrase, or sentence. Examples of input text 212 and sets 221 are shown in the following tables I-III. Table I shows the input text 212 split into three sets 221, with each of the sets 221 including one element. Table II shows input text 212 split into three sets 221, with the first text set 222 including two elements that are non-contiguous with respect to each other, the second text set 224 including one element, and the third text set 226 being an empty set. Table III shows the first text set 222 and the third text set 226 being empty and the second text set 224 including five elements with each word of the input text 212 corresponding to one element.

TABLE I

| Overall Input Text | "Now playing your jazz playlist" |
|---|---|
| First text set | {"Now playing your"} |
| Second text set | {"Jazz"} |
| Third text set | {"Playlist"} |

TABLE II

| Overall Input Text | "Now playing your jazz playlist" |
|---|---|
| First text set | {"Now playing your", "playlist"} |
| Second text set | {"Jazz"} |
| Third text set | { } |

TABLE III

| Overall Input Text | "Now playing your pop playlist" |
|---|---|
| First text set | { } |
| Second text set | {"Now", "playing", "your", "pop", "playlist"} |
| Second text set | { } |

In some examples, the input text 212 is pre-portioned such that the input text 212 is obtained with markers delineating how the input text 212 is to be portioned into sets or the input text 212 is provided as multiple separate sets. In such examples, the text-to-speech engine 110 can parse the input text 212 to determine whether the input text 212 is already portioned and, if so, portion the input text 212 into different sets.

In some examples, the input text 212 is obtained without the input text 212 being pre-portioned. In such instances, the text-to-speech engine 110 can portion the input text 212 using various techniques. In some examples, there is a store of text data that the text-to-speech engine 110 uses to portion the text. For instance, the store (e.g., a dictionary data structure) defines key-value pairs that match text data (e.g., words, phrases, or types of content) with what kind of set the text data should be placed. In an example, the store includes the key-value pair {"rock":1} indicating that where the word "rock" appears in the input text 212, the word "rock" should be put into the first text set 222. In another example, the text-to-speech engine 110 uses a natural language processor to process the input text 212 and portion the input text 212 into sets 221. In another example, a machine learning algorithm (e.g., a neural network) that is trained to classify input text 212 processes the input text 212 data to portion it into sets 221.

The portioning can be based on various factors or parameters. In some examples, the portioning includes identifying words or phrases that are suited to being turned into audio output by taking a snippet from a track (e.g., a song title where the song title is sung in a song, such as "Panama" by Van Halen) and placing such words or phrases in a corresponding set. By contrast, certain words or phrases may be more suited for being turned into audio output through use of a speech synthesizer (e.g., certain error messages, such as "I'm sorry, I couldn't find a track with that name"). Following operation, 220, in some examples the flow moves to operation 228. In other examples, the flow moves to operation 230.

Operation 228 includes determining a quality associated with the first text set 222. The quality 229 is an attribute of the first text set 222 that is useful for identifying a track from which a snippet can be obtained that matches the first text set 222. For instance, the quality 229 can be a music genre. The music genre can be detected by the genre being explicitly stated in the first text set 222 (e.g., the first text set 222 includes the name of a genre) or by being inferred by the content of the text set (e.g., the first text set 222 includes a name of an artist or song associated with a genre). The quality 229 can be a music artist. The music artist can be detected by the artist being explicitly stated in the first text set 222 (e.g., the first text set 222 includes the name of the artist) or by being inferred by the content of the text set (e.g., the first text set 222 includes a name of a track associated with an artist). In some examples, the quality 229 includes a personality to be conveyed by the audio output 14. For instance, where the process 200 is performed in response to input text 212 from a virtual assistant having a specific personality (e.g., upbeat, soft-spoken, peppy, edgy, etc.), the quality 229 can describe the personality of the virtual assistant that is going to use the audio output 14. This can improve the ability of the virtual assistant to interact with a user by preventing a jarring mismatch between the personality of the virtual assistant and the track used in conjunction with the first text set (e.g., it can be undesirable to have audio output for virtual assistant with a peppy cartoonish personality include a sample from a death metal song). In other examples, the quality 229 is a mood (e.g., happy or sad), a tempo (e.g., fast or slow), an era (e.g., the 1970s), a region (e.g., Southern United States), or another attribute.

Operation 230 includes identifying a first track 232 having first track lyrics 234 that include some or all of the elements of the first text set 222. In some examples, the identifying includes, for each element of the first text set 222, searching the media content data store 160 (e.g., the lyrics data store 164 thereof) for tracks with lyrics including the element. In some examples, the searching is performed using a lyrics provider service, such as by sending a request over an application programming interface of a lyrics provider.

In some examples, if no tracks are found, the flow moves back to operation 220 to modify the first text set 222. The modifying can be to increase the chance that a track is found. For instance, the modifying can include splitting elements of the first text set 222 that are phrases into shorter phrases or words. The modifying can also include removing words or phrases from the first text set 222. The modifying can also include adding elements to the first text set 222 that were not there before.

In some examples, if a plurality of tracks are found, then the first track 232 can be selected from the plurality in any of a variety of ways. For instance, a track can be selected from the plurality at random to be the first track 232. In other instances, the text-to-speech engine 110 prompts a user (e.g., via the user device interface 106) or another program (e.g., the program requesting the audio output 14) to select a track from the plurality of tracks. In such instances, the selected track is the first track 232. In other instance, the plurality of tracks are filtered or sorted based a match between the tracks and the quality 229. For instance, the quality 229 can be compared with facets of tracks. The first track 232 can then be selected based on the filtered or sorted tracks (e.g., the tracks are selected in descending order of how well each respective track matches the quality 229 and the top track is selected). In still further instances, the tracks are sorted based on a user's taste profile or listening history, such that tracks that the user enjoys listening to or that are frequently played for the user are more likely to be selected as the first track 232. In addition, tracks that are associated with the input text 212 can be selected as the first track 232 over tracks that are not associated with the input text 212. For instance, where the input text 212 relates to a particular playlist (e.g., "now playing your summer fun playlist") and a track from the particular playlist has lyrics that include the first text set 222, then that track can be selected as the first track 232. In still further examples, the tracks are sorted by their suitability for use in producing the audio output 14 (e.g., based on how clearly the lyric is vocalized or how much background noise there is when the lyric is vocalized).

With the first track 232 selected, the flow moves to operation 240.

Operation 240 includes identifying a first audio location 242 of the first track 232 corresponding to the first text set 222 using forced alignment data 400. For instance, the operation 240 includes identifying a start time and an end time of the portion corresponding to the first text set 222 using the forced alignment data 400. In other examples, a start time and a duration is identified.

In examples, the first audio location 242 need not be limited to a portion where the lyric is vocalized. Instead, the first audio location 242 can be set to logical boundaries (e.g., the beginning and end of a lyrical or musical phrase) of a location in the track that contain the lyric. For instance, where the first text set 222 is the phrase "rock and roll" from the input text "now playing your rock and roll playlist" and the first track 232 can be identified as "Rock and Roll All Nite", the first audio location 242 can be expanded to include the entire lyrical phrase "I wanna rock and roll all night" rather than just the "rock and roll" portion in order to preserve musical context and produce an output that is less jarring to a person hearing the audio output. The resulting audio output would then be "now playing your 'I want to rock and roll all night' playlist" rather than the verbatim "now playing your rock and roll playlist". Following operation 240, the flow moves to operation 250.

Operation 250 includes creating a first audio snippet 252 from the first track 232 that includes the first audio location 242. This operation 250 includes extracting the first audio snippet 252 from the first audio location 242. It should be understood that where audio snippets are extracted from music tracks, the audio snippet can include additional audio beyond human vocal audio, such as the sound of one or more instruments. In some examples, the first track 232 is a special track having isolated vocals of a song or other media content item. In examples, the operation 250 further includes fading the volume of the first audio snippet 252 in at the beginning of the first audio snippet 252 and fading the volume of the first audio snippet 252 out at the end of the first audio snippet 252 to provide a smooth transition.

In some examples, operation 250 further includes operation 254. Operation 254 includes determining a suitability of the first audio snippet 252. In some examples, determining the suitability includes determining how suitable the first audio snippet 252 is for use as part of a text-to-speech system. For instance, the suitability can include determining how clearly the lyrics of the first audio snippet 252 can be heard. In an example, the first audio snippet 252 is provided as input to a speech-to-text system, and the resulting output is compared with the lyrics of the first audio snippet. In an example, the characteristics of the audio of the first audio snippet 252 is analyzed to determine if the audio is suitable for use. In some examples, there is a suitability threshold and, if the first audio snippet 252 does not satisfy the suitability threshold, then the flow moves back to operation 230 for selection of a different track as the first track 232. In some examples, the first audio snippet 252 is processed to enhance the clarity of the speech (e.g., by modifying audio frequencies), and the suitability of the processed first audio snippet 252 is checked again.

Following operation 250, the flow moves to operation 260.

Operation 260 includes creating one or more synthesized utterances 262 based on the second text set 224. In an example, operation 260 includes providing the second text set 224 as input to the speech synthesizer 114 to produce one or more synthesized utterances 262. Following operation 260, the flow moves to operation 280 (see FIG. 2B). In some examples, following operation 260, the flow moves to operation 264 (see FIG. 2B).

Operation 264 includes identifying a second track 266 having second track lyrics 268. In some examples, identifying the second track 266 is the same as or similar to the identifying the first track in operation 230. In some examples, if no track is able to be identified as the second track 266, the flow moves to operation 220 where the input text 212 is portioned into sets again. In other examples, if no track is able to be identified as the second track 266, the flow moves to operation 260 and the third text set 226 is used to create a synthesized utterance.

In some examples, operation 264 further includes operation 270. Operation 270 includes selecting the second track 266 based on similarities in musical style with the first track 232. This can be used to, for example, avoid an undesirable mismatch between the first track 232 and the second track 266. For instance, using an audio snippet from an explicit rap track and an audio snippet from a children's song to form parts of a same audio output 14 can be undesirable and create a poor user experience. In some examples, where there is a plurality of tracks that have second track lyrics, the plurality of tracks can be sorted by an amount of similarity between the facets of a given track of the plurality of tracks and the facets of the first track 232. In some examples, the plurality of tracks are filtered based on the facets of the first track 232. In examples, the similarity is determined based on comparing a distance (e.g., Euclidean distance or cosine distance) between the first track 232 and the second track 266 in a vector space representation of the first track 232 and the second track 266. In examples, determining the similarity of the first track 232 and the second track 266 includes applying one or more of the techniques described in U.S. Pat. No. 8,073,854, entitled "Determining the similarity of music using cultural and acoustic information". If the tracks are sufficiently similar (e.g., the similarity satisfies a similarity threshold), then the second track 266 can be used and the process 200 continues. Otherwise, a different track is selected as the second track 266.

Following operation 264, the flow moves to operation 272.

Operation 272 includes identifying a second audio location 274 corresponding to the third text set 226. In some examples, operation 272 can use the same or similar techniques to those described above in relation to operation 240. Following operation 272, the flow moves to operation 276.

Operation 276 includes creating a second audio snippet 278 including the second audio location 274. In some examples, operation 276 can use the same or similar techniques to those described above in relation to operation 250. Following operation 276, the flow moves to operation 280.

Operation 280 includes forming combined audio 282 by combining the first audio snippet 252, the second audio snippet 278 (when created), and the synthesized utterance 262. This operation 280 includes concatenating the first audio snippet 252, the second audio snippet 278 (if exists) and the synthesized utterance 262 together such that the resulting combined audio 282 corresponds to the input text 212. For instance, this operation 280 can include splitting or rearranging the audio to match the order in which the text occurs in the input text 212. Following operation 280, the flow moves to operation 290.

Operation 290 includes providing an audio output 14 that includes the combined audio 282. This can include providing the audio output 14 as output via an audio output device of the user device 100. In some examples where the operation 290 is performed by the server 150, the operation 290 can include providing (e.g., streaming or making available for download) the audio output 14 to the user device 100.

Generating Forced Alignment Data

Figure 3:
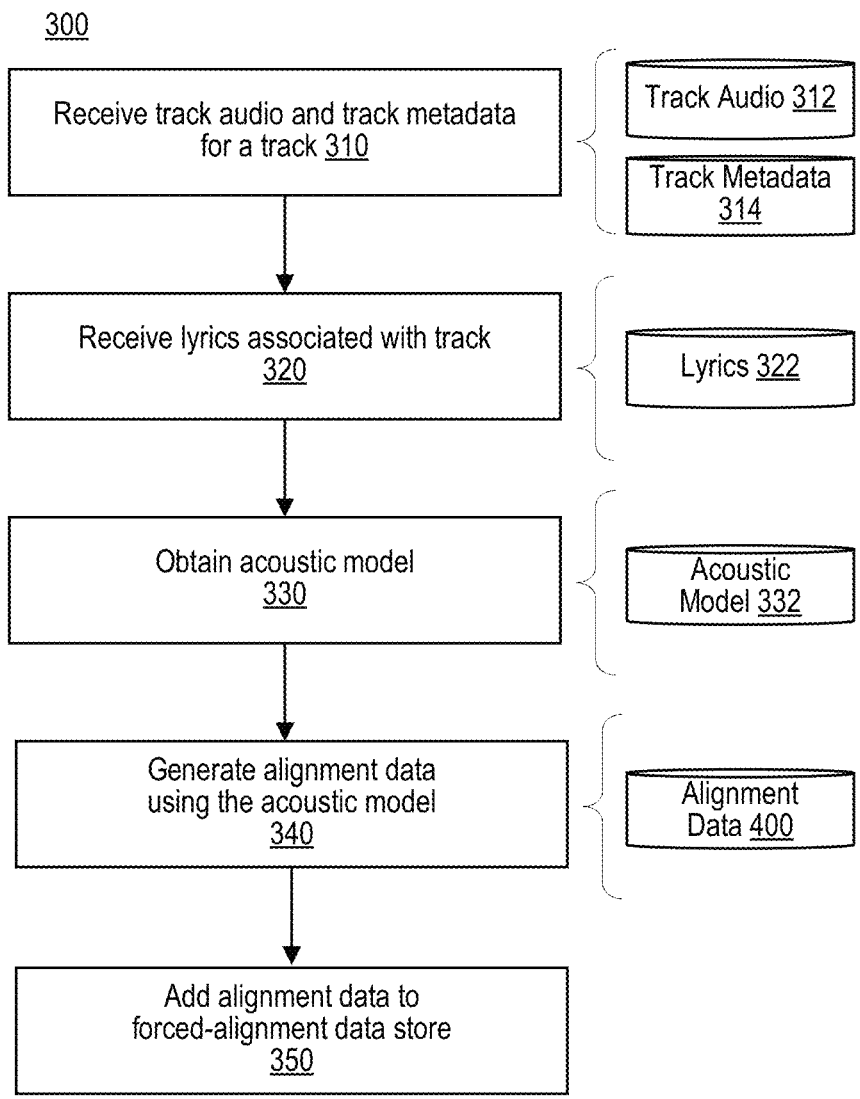
FIG. 3 illustrates a process for creating forced alignment data according to an example embodiment of the present invention.

FIG. 3, illustrates a process 300 for creating forced alignment data for a track, such as the forced alignment data 400 used in operations 240 and 272. The process 300 begins with operation 310.

Operation 310 includes receiving track audio 312 and track metadata 314 for a track. In some examples, the track audio 312 is received from a user or a program (e.g., over an API) as an identifier of the track audio 312 (e.g., a unique identifier thereof) or a file path to the track audio 312. In some examples, the track audio 312 is obtained using the identifier or file path. In some examples, the track audio 312 is identified by the location of the track audio 312 in the track data store 162 and receiving the track audio 312 includes obtaining the track audio 312 from the track data store 162. In some examples, the track audio 312 itself is provided directly. The track metadata 314 can be obtained in a similar manner. For example, the track metadata 314 can be received from a user or a program as an identifier of metadata, an identifier of the track (e.g., usable to look up the metadata in the media content data store 160), or a path to a location storing metadata. In some examples, the metadata is provided directly. Following operation 310, the flow moves to operation 320.

Operation 320 includes receiving lyrics 322 associated with the track audio 312. In an example, this includes obtaining the lyrics from the lyrics data store 164 using an identifier associated with the track having the track audio 312. In examples, the identifier is defined in the track metadata 314. In other examples, the lyrics 322 are obtained from a third party data source that provides lyrics. Following operation 320, the flow moves to operation 330.

Operation 330 includes obtaining an acoustic model 332. The acoustic model 332 is a model describing the relationship between the pronunciation of the lyrics (e.g., the phonemes thereof) and the audio itself. In examples, there is a general acoustic model 332 that is used for the process 300. In some examples, the acoustic model 3232 is a triphone acoustic model trained on dictated speech (e.g., dictated books from the LIBRIVOX collection of public domain audiobooks). While a general acoustic model 332 trained on general speech data (e.g., dictated books) can be used, such an acoustic model 332 can have decreased accuracy compared to acoustic models 332 trained on audio of tracks. The accuracy of the acoustic models 332 can be increased further by having a plurality of acoustic models 332 available for use, with each of the acoustic models 332 being trained for use with particular kinds of track audio 312 (e.g., track audio 312 produced by particular musical genres or artists). In such examples, obtaining the acoustic model 332 includes selecting the acoustic model 332 from a plurality of available acoustic models 332 using the track metadata 314. For instance, the acoustic models 332 can be stored in the acoustic model data store 118 in association with acoustic model metadata describing the attributes (e.g., facets) of tracks used to produce the respective acoustic model 332. The attributes of the track audio 312 and the attributes used to train respective acoustic models 332 can be compared and an acoustic model 332 that most closely matches the attributes of the track audio 312 can be selected. Following operation 330, the flow moves to operation 340.

Operation 340 includes generating forced alignment data 400 using the acoustic model 332. In an example, generating the forced alignment data 400 includes using an aligner to find a Viterbi path through the lyrics 322 and the track audio 312 under the acoustic model 332. In an example Feature space Maximum Likelihood Linear Regression (fMLLR) is used. For instance fMLLR adaption of the acoustic model 332 to track audio 312 is learned. In an example, generating the forced alignment data 400 includes generating the forced alignment data 400 on a line-by-line basis (e.g., rather than aligning an entire track at once). Line-by-line alignment can speed up the alignment process. In other examples, the lyrics 322 are aligned without manual line boundaries and are instead aligned using acoustic cues for pauses. In some examples, a pronunciation dictionary (e.g., CMUDICT, the Carnegie Mellon University Pronouncing Dictionary) is used to determine pronunciation. For lyrics that include of out-of-vocabulary words in lyrics, a pronunciation estimator can be used (e.g., PHONETISAURUS by Josef Novak). In some examples, a forced alignment tool can be used to perform the alignment (e.g., the MONTREAL FORCED ALIGNER by McAuliffe et al.). Following operation 340, the flow moves to operation 350.

Operation 350 includes adding the forced alignment data 400 to the forced alignment data store 158. In some examples, an adapted acoustic model is computed when the forced alignment data 400 is generated. In such examples, the adapted acoustic model can be stored in association with the forced alignment data 400. The forced alignment data 400 can then be used as part of, for example, process 200 to produce audio output 14.

Forced Alignment Data

FIG. 4, illustrates an example visual representation of forced alignment data 400. In the illustrated example, the forced alignment data 400 includes time data 410, audio data 420, and lyrics data 430. The audio data 420 is visually represented as audio waveform data 422 and audio spectrogram data 424. The audio spectrogram data 424 includes pitch data 426. The lyric data is illustrated as being represented as word lyrics data 432, and phoneme lyrics data 434. The forced alignment data 400 is visually represented in a manner that shows alignment among the data vertically. For example, as illustrated, the lyric "highway" begins in the audio data 420 at time unit 9 and the word ends at approximately time unit 15. When implemented programmatically, the relationship between the data can be expressed using any suitable data structure and need not include all of the components illustrated in FIG. 4. In an example, where the lyric "highway" is to be extracted from the track having the audio data 420, the beginning and end of the word can be determined using the lyrics data 430 and the time data 410.

Example Use

Figure 5:
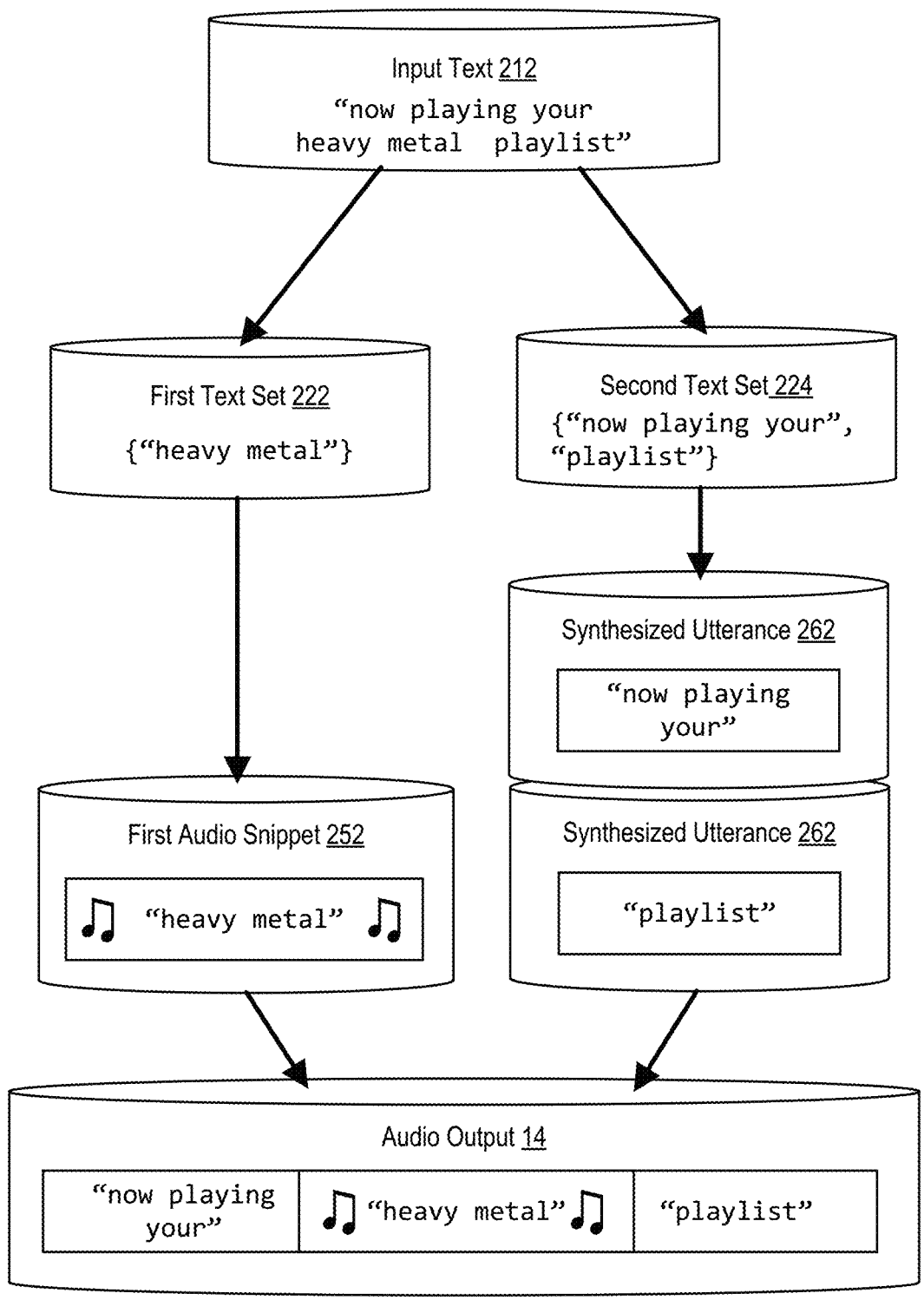
FIG. 5 illustrates an example use of a system for producing an audio output according to an example embodiment of the present invention.

FIG. 5 illustrates an example use of the system 10 to produce an audio output 14. In the illustrated example, the text-to-speech engine 110 receives "now playing your heavy metal playlist" as input text 212 from a virtual assistant program operating on the user device 100 via a function call. The text-to-speech engine 110 processes the input text 212 and portions the input text 212 into a first text set 222 containing "heavy metal" and a second text set 224 containing "now playing your" and "playlist". The second text set 224 is passed to the speech synthesizer 114 to produce two synthesized utterances 262: one vocalizing the phrase "now playing your" and another vocalizing the word "playlist".

The text-to-speech engine 110 identifies a track that contains the lyric "heavy metal" contained in the first text set 222 (e.g., the track "Born to be Wild" is identified because it contains the lyric "heavy metal"). The portion of the track where the lyric is sung is identified using the forced alignment data 400 for the track, and the first audio location 242 containing that lyric is extracted to form the first audio snippet 252.

The synthesized utterances 262 and the first audio snippet 252 are combined in the order in which their respective text appears in the input text 212 to form the audio output 14: "now playing your heavy metal playlist", where the phrase "heavy metal" is an audio snippet from a track rather than vocalized using a speech synthesizer and the remainder of the output is produced by the speech synthesizer 114. The audio output 14 is then output from the user device 100.

While various examples of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

Various operations and processes described herein can be performed by the cooperation of two or more devices, systems, processes, or combinations thereof.

It should be further understood that the term "text" is used for convenience and may refer to, for example, alpha characters, numeric characters, alphanumeric characters, American Standard Code for Information Interchange (ASCII) characters, symbols, or foreign language unicode (e.g., UTF-8).

The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Further, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result. Software examples of the examples presented herein may be provided as a computer program product, or software, that may include an article of manufacture on a machine-accessible or machine-readable medium having instructions.

The invention claimed is:

1. A system providing text-to-speech functionality, comprising:
   a text-to-speech engine configured to:
      portion an input text into a first text set and a second text set using key-value pairs that match text data with a corresponding text set, wherein the input text is not pre-portioned;

identify from a plurality of tracks, at least one audio snippet from a first track, the first track having lyrics corresponding to at least one word of the first text set;

use a speech synthesizer to create a synthesized utterance of at least one word of the second text set, thereby generating a synthesized utterance;

combine the at least one audio snippet and the synthesized utterance to form combined audio; and provide an audio output that includes the combined audio.

2. The system according to claim 1, further comprising:

a forced alignment data store having stored thereon forced alignment data for the plurality of tracks.

3. The system of claim 2, wherein the forced alignment data describes alignment between audio data of the tracks and lyrics data of the tracks.

4. The system of claim 2, wherein the forced alignment data, for each of the tracks, describes lyrics data and time data of where lyrics occur in the audio data.

5. The system of claim 2, further comprising:

a forced alignment engine is configured to:

receive a track of the plurality of tracks having track metadata;

receive track lyrics associated with the track;

select an acoustic model from an acoustic model data store based on the track metadata;

using the acoustic model, generate track forced alignment data that aligns audio data of the track and the track lyrics; and add the track forced alignment data to the forced alignment data store.

6. The system of claim 1, the text-to-speech engine further operable to:

determine a suitability of the at least one audio snippet, including by determining how clearly the lyrics of the at least one audio snippet can be heard.

7. The system of claim 1, wherein the text-to-speech engine is further configured to:
portion the input text into a third text set; and
identify from a plurality of tracks, at least one audio snippet from a second track having lyrics corresponding to at least one word of the third text set;

wherein the combined audio further includes the at least one audio snippet from the second track.

8. The system of claim 7, wherein the identifying the at least one audio snippet from the second track is further based on audio characteristics of the first track and the second track.

9. The system of claim 8, wherein identifying the at least one audio snippet from the second track includes:

selecting the second track based on similarities in musical style between the first track and the second track.

10. The system of claim 9, wherein the similarities in musical style between the first track and the second track is determined based on a distance between the first track and the second track in a vector space.

11. The system of claim 1, further comprising a forced alignment engine for aligning input track audio and input track lyrics.

12. The system of claim 11, wherein the forced alignment engine is configured to find a Viterbi path through the input track lyrics and the input track audio under an acoustic model.

13. The system of claim 11, wherein the forced alignment engine is configured to align the input track lyrics and input track audio on a line-by-line basis.

14. The system of claim 1, wherein the combining engine is further configured to:

determine a quality described in the input text, wherein identifying at least one audio snippet from the first track is based at least in part on the quality.

15. The system of claim 14, wherein the quality is a music genre or music artist.

16. A method for providing text-to-speech functionality, comprising:

portioning an input text into a first text set and a second text set using key-value pairs that match data with a corresponding text set, wherein the input text is not pre-portioned;

identifying from a plurality of tracks, at least one audio snippet from a first track, the first track having lyrics corresponding to at least one word of the first text set;

creating a synthesized utterance of at least one word of the second text set, thereby generating a synthesized utterance;

combining the at least one audio snippet and the synthesized utterance to form combined audio; and providing an audio output that includes the combined audio.

17. The method according to claim 16, further comprising:

storing, in a forced alignment data store, forced alignment data for the plurality of tracks.

18. The method of claim 17, wherein the forced alignment data describes alignment between audio data of the tracks and lyrics data of the tracks.

19. The method of claim 17, wherein the forced alignment data, for each of the tracks, describes lyrics data and time data of where lyrics occur in the audio data.

20. The method of claim 16, further comprising:

determining a suitability of the at least one audio snippet, including by determining how clearly lyrics of the at least one audio snippet can be heard.

* * * * *